United States Patent Office 2,735,801
Patented Feb. 21, 1956

2,735,801

CATALYST SUPPORTS AND PROCESS FOR PREPARING THE SAME

Carlos L. Gutzeit, Woodbury, N. J., assignor to Socony Mobil Oil Company, Inc., a corporation of New York No Drawing. Application February 9, 1951,
Serial No. 210,285

2 Claims. (Cl. 196—50)

This invention relates to improved catalyst supports and to a process for preparing them. More particularly, the present invention is concerned with improved coprecipitated silica-alumina supports for aromatization reforming catalysts, with a process for the preparation of these catalyst supports, and with a reforming process utilizing catalysts comprising chromia supported on these catalyst supports.

As is well known to those familiar with the art, metal oxides which are active as dehydrocyclization and aromatization catalysts, such as chromia, are generally supported on alumina. These catalysts usually are prepared either by coprecipitation of the hydrous oxides or of other compounds which decompose to form the metal oxides under conditions of calcination, or by impregnation of alumina with aqueous solutions, such solutions being selected to avoid hydrolysis or other decomposition during the impregnation operation but which decompose under conditions of calcination to leave a residue which consists of the catalytically active metal oxides.

As is also well known, silica-alumina composites have likewise been used as supports for aromatization reforming catalysts. The steam stability of calcined bauxite, a mineral alumina containing some silica, compared to the instability to steam of substantially pure alumina, has been recognized. Indeed, silica-alumina composites, obtained by coprecipitation of silica and alumina and containing from about 10% to about 30% silica, have been proposed as improved supports for aromatization reforming catalysts such as chromia, molybdena and the like.

Aromatization reforming at low pressures, typically, at temperatures of 900–1050° F. and at pressures of atmospheric up to 65 pounds per square inch, produces an improvement in octane number principally as a result of dehydrocyclization of paraffins into aromatics, dehydrogenation of cyclohexanes into aromatics, and, to a limited extent, dehydrogenation of paraffins into olefins. On the othed hand, aromatization reforming under hydrogen pressure, which has the advantage of decreased coke deposition, other reaction variables remaining the same, preferentially suppresses dehydrocyclization and olefin formation. Consequently, typical operations at temperatures of 900–1050° F., at pressure of 215–765 pounds per square inch, and hydrogen to hydrocarbon mole ratios of 1:1 to 10:1 depend principally upon dehydrogenation of cyclohexanes for improvement in octane number. Under ideal conditions, i. e., in the absence of undesirable side reactions, aromatization reforming leads to severe volume losses because of the increase in density associated with aromatic formation. For example, there is a 28% decrease in volume on conversion of n-heptane into toluene and a 16.5% decrease in volume on conversion of methylcyclohexane into toluene.

There are two general ways of increasing the octane number-gasoline yield relationship obtained by aromatization reforming. One is to increase selectivity for aromatization reactions, whereby the ratio of aromatic formation to side reactions leading to coke and fixed gas formation is increased. The other is to superimpose isomerization reactions upon those normally associated with aromatization reforming. While isomerization alone will not produce a large increase in octane number under aromatization reforming conditions, a combination of isomerization with dehydrogenation can contribute appreciably to octane number improvement, especially when reforming under hydrogen pressure. This is becaues a combination of isomerization with dehydrogenation converts alkylcyclopentanes into aromatics and straight-chain paraffins into branched-chain isomers, both having higher octane numbers.

In reforming operations involving low pressures, a combination of isomerization with aromatization is only of small value, and may be undesirable. This is due to the fact that the improvement in octane number is due primarily to dehydrocyclization. The effect of a superimposed isomerization depends upon a balance between the gain from the conversion of alkylcyclopentanes into aromatics and the loss resulting from the conversion of dehydrocyclizable paraffins into non-cyclizable isomers. Also to be considered is the usual loss due to increased coke and gas formation associated with isomerization under reforming conditions.

In reforming operations involving hydrogen pressure, a combination of isomerization with aromatization is usually favorable. Since, in this case, the magnitude of dehydrocyclization is small or negligible, and the improvement in octane number is due primarily to dehydrogenation of naphthenes into aromatics, any conversion of cyclopentanes into aromatics or isomerization of n-paraffins into branched-chain isomers is beneficial. The isomerization is disadvantageous only if the degradation resulting from hydrocracking, which always accompanies isomerization under hydrogen pressures, is excessive. The ratio of the magnitude of hydrocracking to the magnitudes of isomerization and dehydrogenation depends upon operating conditions as well as the nature of the catalyst employed.

The foregoing discussion accounts for the fact that highly selective dehydrocyclization catalysts may be superior at atmospheric pressure and inferior under hydrogen pressure, while isomerization-dehydrogenation cataylsts may be inferior at atmospheric pressure and superior under hydrogen pressure. For example, typical alumina-supported chromia catalysts are superior at low pressures and inferior under hydrogen pressures because they promote dehydrocyclization reaction selectively, while typical alumina-supported molybdena catalysts, being isomerization-dehydrogenation catalysts, are superior under hydrogen pressures and substantially useless at atmospheric pressure.

Petroleum naphthas, however, vary in composition and, hence, in susceptibility to various types of aromatization reforming. Those naphthas which contain relatively large amounts of naphthenes and small amounts of paraffins respond well to isomerization-dehydrogenation reforming such as that which is promoted by alumina-supported molybdena catalysts. Those naphthas which contain relatively large amounts of paraffins and small amounts of naphthenes respond well to dehydrocyclization reforming such as that which is promoted by alumina-supported chromia catalysts.

It has now been discovered that it is possible to provide silica-alumina supports for aromatization-reforming catalysts, such as supported chromia, which impart to the catalyst dehydrocyclization and isomerization activity in such a way that improved octane number-gasoline yield relationships are obtained with either paraffinic or naphthenic petroleum naphthas. It has been found that these improved silica-alumina catalyst supports are obtained through the rapid coprecipitation of the hydrous silica and hydrous alumina at specified pH values with subsequent aging of the coprecipitated hydrous oxides at the pH of precipitation.

Accordingly, it is a broad object of the present invention to provide new compositions of matter. Another object is to provide new silica-alumina composites. A further object is to afford improved catalyst supports. It is an important object to provide a process for preparing improved silica-alumina catalyst suports. It is a specific object to provide improved silica-alumina catalyst supports. A more specific object is to provide improved aromatization reforming catalysts. It is a very specific object to provide improved silica-alumina supports for aromatization reforming catalysts. A very important object is to provide a reforming process utilizing catalysts comprising chromia supported on the improved silica-alumina catalyst supports. Other objects and advantages of the present invention will become apparent to those skilled in the art from the following description.

Broadly stated, the present invention provides:

A process for effecting reforming of petroleum naphthas, which comprises contacting a petroleum naphtha under reforming conditions, with a catalyst comprising chromia supported on silica-alumina catalyst supports prepared by coprecipitating hydrous silicon oxide and hydrous aluminum oxide at a specified pH, and aging the coprecipitated hydrous oxides at the pH of precipitation.

Silica-alumina supports for aromatization reforming catalysts are important for three principal reasons, as follows:

1. They are more stable to steam than supports consisting of substantially pure alumina;

2. Silica is one of the few relatively cheap and easily available materials which can be added to alumina to increase the surface area and structural stability of alumina supports prepared from hydrous aluminum oxide; and 3. The incorporation of silica in alumina base materials, under suitable conditions, alters the nature of reactions obtained with supported types of aromatization reforming catalysts in such a way that the octane number-gasoline yield relationships obtained are more advantageous. This alternation of reactions appears to be a result of the addition of isomerization reactions to those normally associated with aromatization reactions.

There appears to be nothing critical in the method of effecting the coprecipitation of the hydrous silicon oxide and the hydrous aluminum oxide. In general, any method of coprecipitation known to the prior art can be utilized. The mole ratio of silica to alumina in the final catalyst can vary between about 10:90 and about 30:70, preferably, between about 10:90 and about 15:85, respectively. However, it is essential, in accordance with the present invention, to effect the precipitation at a pH falling within the range varying between about 8.5 and about 11.5, and, preferably, between about 9.5 and about 10.5.

Those familiar with the art will appreciate that a variety of reagents and a wide range of concentrations of the reagents in the starting aqueous solutions can be used herein. Thus, for example, the source of the silica component may be any water-soluble alkali-stabilized colloidal silica from which hydrous silicon oxide may be precipitated by the addition of sulfuric or nitric acid, as is well known in the art. Sodium aluminate, aluminum sulfate, aluminum nitrate and aluminum chloride can be used as sources of the alumina component from which hydrous aluminum oxide can be precipitated by the addition of a mineral acid, in the case of sodium aluminate, or by the addition of the hydroxides of sodium, potassium or ammonium, in the case of the others.

After coprecipitation, it is also essential, in accordance with the present invention, to age the mixed hydrous silicon oxide and hydrous aluminum oxide at a pH substantially equal to that used in the coprecipitation operation, i. e., at a pH falling within the range varying between about 8.5 and about 11.0. Rapidly precipitated, hydrophylic hydrous oxides form highly meta-stable, mobile systems which alter rapidly by adsorption and desorption of ions, syneresis with loss of water, growth of crystallites and other changes, many of which are not understood. These changes, the result of aging, occur rapidly, immediately after precipitation and become slower as the system becomes stabilized. Accordingly, aging, as is well known in the art, connotes leaving the precipitate, in its mother liquor as a slurry or after filtration, in a quiescent state for a period of time, or, for the purpose of the present invention, aging of the coprecipitated hydrous oxides may be defined as contacting the coprecipitated hydrous oxides with an aqueous solution having a pH falling within the range varying between about 8.5 and about 11.0 for a given period of time. The period of time involved in the aging operation is not too critical. In practice, aging for about 4 to about 24 hours, has been found to be satisfactory.

After aging, the coprecipitated hydrous silicon oxide and hydrous aluminum oxide are water-washed. The washing operation may be carried out in any manner known to the prior art. As is well known, the coprecipitated hydrous silicon oxide and hydrous alumina are washed until they are substantially free of water-soluble impurities. Residual alkali metal ions are then removed by base exchange with dilute aqueous solutions of an aluminum or ammonium salt.

Also as practiced by the prior at, the preliminary drying is carried out at a temperature below 100° C., preferably, at a temperature of about 70° C.–80° C. This is followed by calicination which is effected by heating gradually up to a temperature of about 600°C. to about 750° C., to ensure obtaining a product having a relatively high surface area, and thereafter maintaining the silica-alumina at such temperatures for a period of time varying between about eight hours and about four hours. The finished product may be used in any of the conventional forms such as powdered, pills, spheres, extrudates or irregular fragments, alll of a size suitable for the desired subsequent use.

The silica-alumina of the present invention may be used as a catalyst support for any of the metal oxides or sulfides known to be active as dehydrocyclization or aromatization catalysts. As is well known, these oxides and sulfides include those of the metals of Groups V, VI, and VIII of the Periodic Table.

Impregnation of the silica-alumina contemplated herein with salts of these metals is effected in accordance with conventional methods. Thus, for example, when chromia is the catalyst, compounds such as chromic acid, chromic nitrate, or chromic acetate, which decompose under normal conditions of calcination to leave a residue consisting essentially of chromia, are employed. Ordinarily, the amount of chromia, calculated as chromium sesquioxide, varies between about 5% and about 50% based on the weight of the chromia-silica-aluminacatalyst.

The following detailed examples are for the purpose of illustrating the present invention and to indicate the advantages thereof and, also, for the purpose of showing modes of embodying the invention. It must be appreciated, however, that the invention contemplated herein is not to be construed as being limited to the specific catalysts, methods of catalyst preparation and evaluation, and specific manipulations and conditions set forth in the examples. As those skilled in the art will readily understand, numerous modifications and variations therein, all within the purview of the foregoing discussion, are possible, and, accordingly, must be considered to be encompassed by the scope of this invention.

EXAMPLES 1–11

A.—Preparation of Silica-Alumina Base

Catalyst compositions are based on solution strengths, assuming no loss of precipitated hydrous oxides. Compositions are indicated as mole ratios. Surface area measurements were made on the catalyst bases before impregnation. Measurements have shown that impregnation with chromia or chromia and potassium does not alter the surface area more than the error of the measurement.

In all cases, the source of silica was sodium silicate containing a mole ratio of $SiO_2$ to $Na_2O$ of 3.21.

(a) Using sodium aluminate

The sodium aluminate powder contained 75% $NaAlO_2$ and 10–15% excess NaOH. It was dissolved in water to form an approximately 4-molar solution which was stabilized through the addition of about 25 ml. of glycerine per liter.

(1) $SiO_2:Al_2O_3=10:90$

To an aqueous solution containing 2.7 moles of alumina as $NaAlO_2$ in 2 liters of water there was added, gradually and with stirring, an aqueous solution containing 0.3 moles of $SiO_2$ as sodium silicate in 500 ml. of water. The clear solution obtained had a pH=11.1 and became cloudy from a slight precipitate within 3 minutes. An aqueous solution of 220 ml. of concentrated sulfuric acid in 3 liters of water was added, rapidly and with vigorous stirring, to produce a slurry having a pH=7.9. After aging for 24 hours, the slurry was filtered, the precipitate was water-washed until it was substantially free of soluble salts, and then base-exchanged by washing with 0.1N nitric acid. The filter cake was then dried overnight at a temperature of 80–85° C. in an air current and calcined by heating gradually up to a temperature of 600° C. over a 6-hour period and maintaining it at this temperature for 2 hours. The surface area of this base was equal to 252 square meters per gram.

(2) $SiO_2:Al_2O_3=14:86$

To 14 liters of water stirred by an efficient, high-speed stirrer, there were added, in the order named, 1014 ml. of 5.3 molar aqueous solution of sodium aluminate (6.9 molar with respect to NaOH), 102.5 ml. of an aqueous solution of sodium silicate (4.29 molar with respect to $SiO_2$ and 6.44 molar with respect to NaOH), and 1300 ml. of 6N nitric acid. The solution became cloudy from a slight precipiate after addition of the sodium silicate solution to the sodium aluminate solution. The final pH was equal to 7.3. Washing, drying and calcination were the same as in the preceding example except that base-exchange was effected by reslurrying with an equal volume of a 0.1 molar, aqueous solution of aluminum nitrate [$Al(NO_3)_3$] followed by an additional filtration. The surface area of this base was equal to 217 square meters per gram.

(3) $SiO_2Al_2O_3=14:86$

To 14 liters of water stirred by an efficient, high-speed stirrer, there were added 1400 ml. of 6 molar nitric acid. Then, as rapidly as good mixing permitted, 1014 ml. of 5.3 molar sodium aluminate (6.9 molar with respect to NaOH) were added. Finally, there were added 102.5 ml. of sodium silicate (4.29 molar with respect to $SiO_2$ and 6.44 molar with repect to NaOH). The pH of the final slurry was equal to 5.15. The washing, base-exchanging, drying and calcination were the same as in the preceding example. The surface area of this base was equal to 193 square meters per gram.

(4) $SiO_2:Al_2O_3=14:86$

The preparation of this base was similar to that used in Example 2, except that the volume of 6N nitric acid used was reduced from 1400 ml. to 1100 ml. The pH of the final slurry was equal to 9.6. The surface area of this base was equal to 274 square meters per gram.

(5) $SiO_2:Al_2O_3=14:86$

To 14 liters of distilled water, there were added, with stirring, one liter of 5.3 molar, aqueous solution of sodium aluminate (6.9 molar with respect to NaOH) and then, 101 ml. of an aqueous solution of sodium silicate (4.29 molar with respect to $SiO_2$ and 6.44 molar with respect to NaOH). At this point, the mixture was cloudy from slight precipitation. One hundred ml. of concentrated ammonium hydroxide (14.8 molar) were added as a buffer during neutralization and, finally, there was added one liter of 6N nitric acid. The final pH value was 10.2. After aging for 24 hours, the precipitate was washed until substantially no water-soluble impurities remained. No base-exchange was employed because of the large amount of ammonium ions initially present which serve to displace the sodium ions. The washed hydrous oxides were dried and calcined as in the previous examples. The surface area of this base was equal to 343 square meters per gram.

(6) $SiO_2:Al_2O_3=30:70$

The preparation of this base was similar to that used in Example (1), except that 2.1 moles of $Al_2O_3$ as sodium aluminate and 0.9 moles of $SiO_2$ as sodium silicate were utilized. The pH of the final slurry was equal to 7.9. The surface area of this base was equal to 222 square meters per gram.

(7) $SiO_2:Al_2O_3=50:50$

To 14 liters of distilled water, there were added, with vigorous stirring, 675 ml. of a 5.3 molar, aqueous solution of sodium aluminate (6.9 molar with respect to NaOH), 420 ml. of an aqueous solution of sodium silicate (4.29 molar with respect to $SiO_2$ and 6.44 molar with respect to NaOH), and 2.0 liters of 6N nitric acid to obtain a slurry having a pH equal to 3.85. This was aged for 24 hours, water-washed, base-exchanged with a 0.1 molar, aqueous solution of aluminum nitrate [$Al(NO_3)_3$], dried and calcined as in Example 1. The surface area of this base was equal to 264 square meters per gram.

(8) $SiO_2:Al_2O_3=50:50$

The preparation of this catalyst base was similar to that used in the preceding example, except that the amount of 6N nitric acid used was decreased from 2.0 liters to 1.6 liters in order to obtain a slurry having a pH equal to 9.8. The surface area of this base was equal to 196 square meters per gram.

(9) $SiO_2:Al_2O_3=30:70$

To 1.68 liters of an aqueous solution of sodium silicate (4.29 molar with respect to $SiO_2$ and 6.44 molar with respect to NaOH), corresponding to 7.2 moles of $SiO_2$, there were added 6.7 liters of a 5.36 molar, aqueous solution of sodium aluminate (6.9 molar with respect to NaOH) equivalent to 18 moles of $Al_2O_3$. The silica precipitated partially to form a thick, gelatinous paste. To this, there were added, with vigorous stirring, 3.5 liters of 7 molar sulfuric acid. The hot slurry was filtered to remove a filtrate having a pH equal to 11.5 and containing some sodium aluminate. After aging for 24 hours, the precipitate was water-washed, base-exchanged with dilute aluminum sulfate solution, and again water-washed until no sulfate ions could be detected in the wash water. The product was dried and calcined as in the previous examples. The surface area was equal to 275 square meters per gram.

(b) Using aluminum sulfate

(10) $SiO_2:Al_2O_3=30:70$

To 1030 ml. of sodium silicate (4.29 molar with respect to $SiO_2$ and 6.44 molar with respect to NaOH), corresponding to 3.9 moles of $SiO_2$, there were added, gradually and with stirring, a total of 12.5 liters of a 0.8 molar, aqueous solution of aluminum sulfate [$Al_2(SO_4)_3$], corresponding to 10 moles of $Al_2O_3$. Due to the high alkalinity, the alumina dissolved during the addition of about half the aluminum sulfate but precipitated with the silica during the latter part of the addition. The initial pH of the slurry was equal to 9.0, but, after aging for 24 hours, it dropped to 6.8. It should be noted that the slurry was strongly alkaline during the greater part of the mixing, thereby minimizing the formation of insoluble, basic aluminum sulfate which forms at pH values of about 6 or lower. In spite of this, the final catalyst base showed the properties of a silica-alumina base formed under acid conditions. The aged hydrous oxides were water-washed, base-exchanged with aluminum sulfate, dried and calcined as in Example 8. The surface area of this base was equal to 281 square meters per gram.

(c) *Using aluminum nitrate*

(11) $SiO_2:Al_2O_3=25:75$

To 3 liters of an aqueous solution of sodium silicate containing 0.9 mole of $SiO_2$ and 12.5 moles of sodium hydroxide, there were added 2860 ml. of a 1.87 molar, aqueous solution of aluminum nitrate, equivalent to 2.67 moles of $Al_2O_3$, to obtain a slurry having a pH equal to 8.5. This material was aged, washed, base-exchanged with 0.1N nitric acid, dried and calcined as in Example 1. The surface area of this base was equal to 226 square meters per gram.

B.—IMPREGNATION OF SILICA-ALUMINA BASE

All the silica-alumina bases were ground to pass through a 60-mesh screen, mixed with 10% by weight of a hydrogenated vegetable oil as a lubricant, pelleted into ⅛-inch tablets and then calcined in air at a temperature of 600° C. for four hours to burn out the lubricant.

Each of the bases was impregnated with an aqueous solution of chromic acid such that it would just be absorbed by the support, usually 50% of the apparent volume of the support. An amount of chromic acid required to produce the desired amount of chromic oxide ($Cr_2O_3$) in the finshed catalyst was diluted to this volume from a concentrated stock solution, usually 4 molar chromic acid. To assure uniformity, impregnation with potassium (where desired) was done in a second step, using the calculated amount of potassium nitrate. The catalysts were dried and calcined at a temperature of 600° C. for 2 hours after each impregnation step.

C.—CATALYST EVALUATION

For purposes of comparison a gel-type alumina, purchased from the Harshaw Chemical Company, having a surface area equal to 170 square meters per gram, was impregnated as in B.

The dehydrocyclization of n-heptane was carried out in an all-glass, conventional, catalyst testing apparatus, under the following conditions:

Temperature _____ 932° F.
Pressure _____ Atmospheric
Liquid hourly space velocity _____ 0.5
Duration of run _____ 2.5 hours The low-pressure reforming of petroleum naphtha was effected in an all-glass, conventional, catalyst testing apparatus, under the following conditions:

Temperature _____ 896° F.
Pressure _____ Atmospheric
Liquid hourly space velocity _____ 0.5
Duration of run _____ 2.5 hours The petroleum naphtha was a light Oklahoma City naphtha having the following properties:

Initial boiling point _____ 70° C.
10% _____ at 80° C.
50% _____ at 88° C.
90% _____ at 100° C.
End point _____ 119° C.
API gravity _____ 63.3
CFRR octane number, clear _____ 60

The pressure reforming of petroleum naphtha was carried out in stainless steel, conventional catalyst testing equipment.

The data tabulated hereinafter were obtained using regenerated catalysts because the activity of fresh catalysts is frequently different from that of regenerated catalysts, especially where promoters are used.

The catalysts were regenerated with pure oxygen at a maximum temperature of 950° F. This method of regeneration is one of convenience and represents no unusual features.

For convenience the pertinent data of the catalysts and the results obtained in the evaluations are set forth in Tables I, II, III and IV.

TABLE I

*Dehydrocyclization of n-heptane with 10 wt. % $Cr_2O_3$ on support*

[Average of two runs with regenerated catalysts]

| Catalyst Base Example No. | $SiO_2:Al_2O_3$ | Surface Area, sq. m./gm. | Toluene in Product, wt. percent | Conversion of Heptane to Toluene, wt. percent | Specific Activity, (Moles Toluene/ sq. m./hr.)× $10^4$ |
|---|---|---|---|---|---|
| | Alumina Gel | 170 | 24 | 23 | 8.9 |
| 4 | 14:86 | 274 | 24 | 21 | 5.1 |
| 4 [1] | 14:86 | 274 | 29 | 27 | 6.1 |
| 5 | 14:86 | 343 | 31.5 | 27.5 | 3.7 |
| 9 | 30:70 | 275 | 19.5 | 18 | 4.9 |
| 9 [2] | 30:70 | 275 | 21.5 | 20.5 | 5.7 |
| 8 | 50:50 | 196 | 8.5 | 8 | 4.0 |
| 8 [1] | 50:50 | 196 | 11.5 | 11 | 7.4 |

[1] Promoted with 1.06 wt. percent $K_2O$.
[2] Promoted with 2.59 wt. percent $K_2O$.

TABLE II

*Low-pressure reforming of light Oklahoma City naphtha with 10 wt. % $Cr_2O_3$ on support—effect of pH*

| Catalyst Base Example No. | $SiO_2:Al_2O_3$ | Surface Area, sq. m./gm. | pH of Precipitation | Products, Based on 100 Wt. Percent Recovery | | | CFRR Octane No. of $C_5$-Free Gasoline, Clear |
|---|---|---|---|---|---|---|---|
| | | | | Coke, Wt. Percent | Gas, Wt. Percent | $C_5$-Free Gasoline, Vol. Percent | |
| | Alumina Gel | 170 | | 8.0 | 7.5 | 82 | 78 |
| 3 | 14:86 | 193 | 5.15 | 6.4 | 5.7 | 87 | 74 |
| 4 | 14:86 | 274 | 9.6 | 9.8 | 7.8 | 79 | 83 |
| 10 | 30:70 | 281 | 6.8 | 6.4 | 4.6 | 87 | 72 |
| 9 | 30:70 | 275 | 11.5 | 6.1 | 4.7 | 89.5 | 75.5 |
| 7 | 50:50 | 264 | 3.85 | 4.2 | 4.7 | 90.5 | 69 |
| 8 | 50:50 | 196 | 9.8 | 2.9 | 2.2 | 95.5 | 67.5 |

TABLE III

Effect of potassium on 10 wt. % chromia on silica-alumina support—low-pressure reforming of light Oklahoma City naphtha

| Catalyst Base Example No. | SiO₂:Al₂O₃ | pH of Precipitation | Potassium Added, Wt. Percent K₂O | Products, Based on 100 Wt. Percent Recovery | | | CFRR Octane No. of C₃-Free Gasoline, Clear |
|---|---|---|---|---|---|---|---|
| | | | | Coke, Wt. Percent | Gas, Wt. Percent | C₃-Free Gasoline, Vol. Percent | |
| 10 | 30:70 | 6.8 | None | 6.4 | 4.6 | 87 | 72 |
| 10 | 30:70 | 6.8 | 1.06 | 3.3 | 3.1 | 93 | 70 |
| 10 | 30:70 | 6.8 | 1.59 | 3.4 | 3.2 | 92 | 69 |
| 10 | 30:70 | 6.8 | 2.65 | 3.0 | 2.8 | 93 | 69.5 |
| 9 | 30:70 | 11.5 | None | 6.1 | 4.7 | 89.5 | 75.5 |
| 9 | 30:70 | 11.5 | 1.06 | 5.7 | 5.2 | 86.5 | 76 |
| 9 | 30:70 | 11.5 | 1.59 | 6.3 | 5.5 | 85 | 78.5 |
| 9 | 30:70 | 11.5 | 2.59 | 6.5 | 7.4 | 82.5 | 82.5 |
| 9 | 30:70 | 11.5 | 4.24 | 5.3 | 4.6 | 87.5 | 76.5 |

TABLE IV

Comparison of low-pressure and pressure reforming of light Oklahoma City naphtha

| Catalyst | 10 Wt. Percent Cr₂O₃ on Alumina Gel | | 10 Wt. Percent Cr₂O₃ on 30:70 SiO₂Al₂O₃(9) | |
|---|---|---|---|---|
| Conditions: | | | | |
| Pressure, Pounds per square inch gauge | 0 | 200 | 0 | 200 |
| Mole Ratio, Hydrogen:Naptha | | 2 | | 2 |
| Temperature, °F | 1,000 | 1,000 | 950 | 1,000 |
| Charge Rate, Liquid Hourly Space Velocity | 1.0 | 1.0 | 0.5 | 1.0 |
| Products, Based on 100 wt. percent Recovery: | | | | |
| Coke, Wt. Percent | 8.0 | 1.2 | 6.1 | 0.70 |
| Gas, Wt. Percent | 7.5 | 18.4 | 4.7 | 13.4 |
| C₃-Free Gasoline, Vol. Percent | 82 | 80 | 89.5 | 85.5 |
| CFRR Octane No. of C₃-Free Gasoline, Clear | 78 | 82 | 75.5 | 81.5 |

Table I shows that the catalysts of this invention are comparable to a corresponding chromia-alumina catalyst in dehydrocyclization activity. The data show that this approximate equality is due primarily to the increase in surface area, since the specific activity or activity per unit surface area is decreased. When the selectivity for dehydrocyclization is increased by the addition of small amounts of potassium, the specific activity for dehydrocyclization is increased but does not equal that for the catalyst base which is free from silica. However, within the range SiO₂:Al₂O₃=10:90 to 30:70, the specific activity is reasonably high and the surface area is very high when compared to that of the alumina base. This accounts for the approximate equality referred to hereinbefore.

Table II shows the effect of pH of coprecipitation on the activity of the chromia-silica-alumina catalysts. Comparing the two pairs of catalysts corresponding to SiO₂:Al₂O₃=14:86 and 30:70, it will be noted that the octane-yield relationship is superior for the catalyst supports prepared at pH's falling within the range of the present invention. Compared to the alumina base catalyst, the 14:86 and 30:70 silica-alumina catalysts prepared at the higher pH's show a marked improvement in the octane-yield relationship. It should be noted also that while the methods of preparation of the silica-alumina base materials set forth in Table II were varied intentionally, the methods were selected to avoid possibility for the formation of basic aluminum sulfate, the high density and low catalytic activity of which might otherwise give misleading results. This was accomplished by starting with a highly alkaline solution in each case, at a pH above about 11, and lowering the pH to the final value, thereby avoiding any initial precipitation at low pH values.

Table III illustrates the difference in response to alkaline promoter between the catalysts contemplated herein and those which are excluded. It is well known that potassium increases the selectivity of chromia-alumina catalysts for dehydrocyclization. This table shows that when promoter amounts of potassium are added to chromia-silica-alumina catalysts in which the base is prepared at a pH outside the range of the present invention, no improvement in octane number is obtained. However, in a catalyst of the same composition but in which the support is prepared at a pH within the range of this invention, the potassium response is excellent, there being an increase in activity corresponding to seven octane units for the optimum potassium addition, viz., 2.6 weight percent of K₂O (although it may vary between about 0.5 weight percent and about 5.0 weight percent K₂O). As expected, higher potassium concentrations cause a reduction in the activity.

Table IV shows a comparison between a catalyst of this invention and a conventional alumina-base catalyst, in low-pressure and pressure reforming of petroleum naphtha. In low-pressure reforming, the octane number of the gasoline obtained, using a chromia-silica-alumina catalyst, is somewhat lower than that obtained using a chromia-alumina catalyst. The yield, however, is sufficiently higher to indicate a better octane-yield relationship for the silica-alumina base catalyst. The results obtained in pressure reforming demonstrate clearly the superiority of the silica-alumina base catalyst. While the octane numbers of the gasolines obtained are approximately the same, the yield obtained, using the silica-alumina base catalyst, is about 5 volume percent higher.

Although the present invention has been described in conjunction with certain embodiments, it is to be understood that modifications and variations therein may be made without departing from the spirit and scope of the invention, as those skilled in the art will readily understand. Such variations and modifications are considered to be within the purview and scope of the appended claims.

What is claimed is:

1. A process for effecting reforming of petroleum naphthas, which comprises contacting a petroleum naphtha with a catalyst comprising chromium oxide supported on a silica-alumina support in which silica and alumina are present in a mole ratio falling within the range varying between about 10:90 and about 30:70, respectively, obtained by effecting the coprecipitation of hydrous silicon oxide and hydrous aluminum oxide at a pH varying between about 9.5 and about 11.5, to produce a mixture of coprecipitated hydrous silicon oxide and hydrous aluminum oxide, aging said mixture at said pH for a period of time falling within the range varying from about 4 hours to about 24 hours, washing said mixture to remove water-soluble impurities, drying said mixture, and calcining said mixture, said contacting taking place at a temperature varying between about 900° F. and about 1050° F., and at a pressure varying between atmospheric and about 65 pounds per square inch.

2. A process for effecting reforming of petroleum naphthas, which comprises contacting a petroleum naphtha with a catalyst comprising chromium oxide supported on a silica-alumina support in which silica and alumina are present in a mole ratio falling within the range varying between about 10:90 and about 30:70, respectively, obtained by effecting the coprecipitation of hydrous silicon oxide and hydrous aluminum oxide at a pH varying between about 9.5 and about 11.5, to produce a mixture of coprecipitated hydrous silicon oxide and hydrous aluminum oxide, aging said mixture at said pH for a period of time falling within the range varying from about 4 hours to about 24 hours, washing said mixture to remove water-soluble impurities, drying said mixture, and calcining said mixture, said contacting taking place at a temperature varying between about 900° F. and about 1050° F., at a pressure varying between about 215 pounds per square inch and about 765 pounds per square inch, and in the presence of hydrogen in amounts varying between about one mole and about 10 moles per mole of hydrocarbon.

References Cited in the file of this patent

UNITED STATES PATENTS

| | | |
|---|---|---|
| 2,299,768 | Shabaker | Oct. 27, 1942 |
| 2,392,248 | Layng | Jan. 1, 1946 |
| 2,437,531 | Huffman | Mar. 9, 1948 |
| 2,437,533 | Huffman | Mar. 9, 1948 |
| 2,442,884 | Webb et al. | June 8, 1948 |
| 2,480,669 | Payne | Aug. 30, 1949 |
| 2,490,287 | Welty | Dec. 6, 1949 |
| 2,499,680 | Plank | Mar. 7, 1950 |
| 2,550,531 | Ciapetta | Apr. 24, 1951 |
| 2,563,650 | Heinemann | Aug. 7, 1951 |